United States Patent [19]

Banjanin et al.

[11] Patent Number: 5,454,372

[45] Date of Patent: Oct. 3, 1995

[54] ANGLE INDEPENDENT DOPPLER IN ULTRASOUND IMAGING

[75] Inventors: Zoran B. Banjanin, Renton; Varaz Shahmirian, Redmond, both of Wash.

[73] Assignee: Siemens Medical Systems, Inc., Iselin, N.J.

[21] Appl. No.: 261,506

[22] Filed: Jun. 17, 1994

[51] Int. Cl.[6] .................................................. A61B 8/00
[52] U.S. Cl. ........................................................ 128/661.08
[58] Field of Search ........................ 128/660.05, 661.01, 128/661.08, 661.09, 661.10; 73/861.25

[56] References Cited

U.S. PATENT DOCUMENTS

| | | | |
|---|---|---|---|
| 4,103,679 | 8/1979 | Aronson | 128/2.05 |
| 4,265,126 | 5/1981 | Papadofrangakis et al. | 73/861.25 |
| 4,416,286 | 11/1983 | Iinuma et al. | 128/663 |
| 4,493,216 | 1/1985 | Hassler | 73/861.25 |
| 4,930,513 | 6/1990 | Mayo et al. | 128/661.09 |
| 4,937,797 | 6/1990 | Snyder et al. | 367/138 |
| 5,038,788 | 8/1991 | Satake | 128/661.09 |

(List continued on next page.)

OTHER PUBLICATIONS

Angle Independent Ultrasonic Detection Of Blood Flow, G. E. Trahey, J. W. Allison, & O. T. Von Ramm, IEEE Trans. Biomed. Eng. vol. BME-34, No. 12, Dec. 1987. pp. 965–967.

Vector Doppler: Accurate Measurement Of Blood Velocity In Two Dimensions, J. R. Overbeck, K. W. Beach, and D. E. Strandness, Ultrasound In Med. & Biol. vol. 18, No. 1, pp. 19–31, 1992.

Two–Dimensional Vector Velocity Mapping In Diagnostic Ultrasound, P. J. Phillips, Dissertation Proposal, 1992, Dept. Biomed. Eng. Duke University.

A Triangulation Method for the Quantitative Measurement of Arterial Blood Velocity Magnitude and Direction in Humans, Ultrasound in Med. & Biol. vol. 16, No. 5, pp. 499–509, 1990.

Overestimation of Velocity and Frequency Values by Multi–element Linear Array Dopplers, R. J. Daigel, A. Thomas Stavros, and R. M. Lee, J. Of Vascular Tech. 14(5), pp. 206–213, 1990.

New Method for Ultrasonic Doppler Probe Angle Determination, T. Tamuva and A. Fronek, J. Biomed. Eng. vol. 10, May 1988, pp. 271–274.

Clinical Blood Flow Measurement, Edited by Dr. J. Woodcock, Year Book Medical Publishers, Inc., Chicago, Ill., pp. 28–32.

A Double Beam Doppler Ultrasound Method For Quantitative Blood Flow Velocity Measurement, W. Weiqi and Y. Lin–Xin, Ultrasound in Med. & Biol. vol. 8, No. 4, pp. 421–425, 1982.

(List continued on next page.)

*Primary Examiner*—George Manuel

[57] ABSTRACT

Method for providing a blood flow velocity display of blood flow in a blood vessel in an ultrasound imaging system by converting spectral Doppler mode data using estimates of blood flow angle and blood flow velocity. In particular, an embodiment of a first aspect of the present invention is a method which includes the steps of: (a) transmitting an acoustic beam to a region of interest in the blood vessel from a first sub-aperture array in a transducer array; (b) receiving a first echo beam from the region of interest at the first sub-aperture array, which first echo beam is generated by the acoustic beam, and a second echo beam from the region of interest at a second sub-aperture array, which second echo beam is generated by the acoustic beam; (c) estimating a first mean Doppler frequency from the first echo beam substantially in parallel with the step of estimating a second mean Doppler frequency from the second echo beam, both steps of estimating utilizing an auto-correlation algorithm; (d) estimating the angle of blood flow and blood flow velocity in the region of interest in the blood vessel from the first and second mean Doppler frequencies; (e) obtaining data to provide a spectral Doppler mode display; (f) converting the dam to provide a blood flow velocity distribution; and (g) displaying the blood flow velocity distribution along with the estimated blood flow angle.

15 Claims, 5 Drawing Sheets

U.S. PATENT DOCUMENTS 5,107,841  4/1992  Sturgill .............................. 128/661.09
5,386,830  2/1995  Powers et al. ..................... 128/661.09

OTHER PUBLICATIONS

Determination of Volume of Arterial Blood Flow by An Ultrasonic Device, S. Uematsu, J. Clin. Ultrasound, pp. 209–216, Jun. 1981.

Multiple Crossed Beam Ultrasound Doppler Velocimetry, M. D. Fox, IEEE. Trans. Sonics and Ultra. vol. SU–25, No. 5, Sep. 1978, pp. 281–286.

ANGLE INDEPENDENT DOPPLER IN ULTRASOUND IMAGING

TECHNICAL FIELD OF THE INVENTION

The present invention relates to method for performing angle independent Doppler analysis in ultrasound.

BACKGROUND OF THE INVENTION

As is well known, current ultrasound imaging systems used in medical applications provide a spectral Doppler mode which is used to detect blood flow and to measure blood velocity in a blood vessel of interest for use in diagnosing arterial and venous disorders. Such current ultrasound imaging systems measure blood flow velocity in a blood vessel of interest by using a Doppler frequency shift which is obtained by analyzing echoes received from a region of interest from one receive beam direction. However, as is known, blood flow velocity measured in this way is a function of the angle of blood flow with respect to the ultrasound transmit beam. Thus, in the absence of information about the blood flow angle, the measured blood flow velocity is only the projection of the true blood flow velocity in the direction of the ultrasound transmit beam. In order to overcome this deficiency, an operator, i.e., a sonographer, has to adjust the ultrasound transmit beam manually to align it with the direction of blood flow in the blood vessel to obtain a more accurate measurement of blood flow velocity. As one can readily appreciate, this method of measuring blood flow velocity is cumbersome and is hard to use to make repeated measurements having the same angle.

As is well known, to obtain the blood flow angle, one needs to receive echoes from a region of interest from more than one direction. Several proposals have been made in the past to solve this problem using multiple beam configurations. However, most of these proposed techniques require multiple transmit and multiple receive beams, all of which complicate transducer functionality and are, therefore, not practical for use in a clinical setting. These multiple beam configurations suffer from an additional problem in that they have to be adjusted to insonify the same region within a blood vessel.

Another technique is described in an article entitled "Angle Independent Ultrasonic Detection of Blood Flow" by G. E. Trahey, J. W. Allison, and O. T. von Ramm, *IEEE Trns. Biomed, Eng.*, vol. BME-34, pp. 965–967, December 1987. This technique is based on tracking motion of a speckle pattern produced by blood to achieve flow direction information. The technique relies on a two-dimensional search of a Doppler image and is, therefore, computationally very intense. For that reason, the technique is not considered to be practical for spectral Doppler applications.

More recently a proposal has been made for another technique that comprises: (a) sonifying a sample volume with one transmit beam and (b) detecting two receive beams from two angles. This technique is disclosed in an article entitled "Vector Doppler: Accurate Measurement of Blood Velocity in Two Dimensions" by J. R. Overbeck, K. W. Brach, and D. E. Strandness, *Ultrasound in Medicine and Biology*, vol. 18, No. 1, pp. 19–31, 1992. In the disclosed technique, a first transducer is used to generate a transmit beam and a second and a third transducer, disposed on either side of the first transducer element, are used to detect receive beams at the same angle with respect to the transmit beam. The technique suffers in that it is limited to a specific configuration and it utilizes a fast-fourier-transform-based mean frequency estimator which makes the disclosed method inaccurate or complicated.

Lastly, a proposal has been made by P. J. Phillips of Duke University in 1992 for still another technique that comprises: (a) sonifying a sample volume with one transmit beam and (b) receiving two receive beams from two angles. In this technique, the transducer aperture is divided into two sub-apertures. A transmit beam is generated at one sub-aperture and a receive beam is detected at the same sub-aperture. Next, a transducer beam is again generated at the same sub-aperture and a receive beam is detected at the other sub-aperture.

In light of the above, there is a need in the art for a method for determining blood flow angle in ultrasound imaging systems and for using this result to provide blood flow velocity distribution displays from spectral Doppler mode analyses.

SUMMARY OF THE INVENTION

Advantageously, embodiments of the present invention solve the above-identified need in the art by providing a method for determining blood flow angle in ultrasound imaging systems and for using this result to provide blood flow velocity distribution displays from spectral Doppler mode analyses.

In particular, an embodiment of a first aspect of the present invention is a method for providing a blood flow velocity distribution display of blood in a blood vessel using an ultrasound imaging system, which method comprises the steps of: (a) transmitting an acoustic beam to a region of interest in the blood vessel from a first sub-aperture array in a transducer array; (b) receiving a first echo beam from the region of interest at the first sub-aperture array, which first echo beam is generated by the acoustic beam, and a second echo beam from the region of interest at a second sub-aperture array, which second echo beam is generated by the acoustic beam; (c) estimating a first mean Doppler frequency from the first echo beam substantially in parallel with the step of estimating a second mean Doppler frequency from the second echo beam, both steps of estimating utilizing an autocorrelation algorithm; (d) estimating a blood flow angle and blood flow velocity in the region of interest in the blood vessel from the first and second mean Doppler frequencies; (e) obtaining data to provide a spectral Doppler mode display; (f) converting the data to provide a blood flow velocity distribution; and (g) displaying the blood flow velocity distribution along with the estimated blood flow angle.

An embodiment of a second aspect of the present invention is a method for providing a blood flow velocity distribution display of blood in a blood vessel using an ultrasound imaging system, which method comprises the steps of: (a) transmitting an acoustic beam to a region of interest in the blood vessel from a first sub-aperture array in a transducer array; (b) receiving a first echo beam from the region of interest at the first sub-aperture array, which first echo beam is generated by the acoustic beam, and a second echo from the region of interest at a second sub-aperture array, which second echo beam is generated by the acoustic beam; (c) estimating a first mean Doppler frequency from the first echo beam substantially in parallel with the step of estimating a second mean Doppler frequency from the second echo beam; (d) estimating a first blood flow angle in the region of interest in the blood vessel from the first and second mean Doppler frequencies; (e) transmitting a second acoustic beam to a region of interest in the blood vessel from the second sub-aperture array; (f) receiving a third echo beam from the region of interest at the second sub-aperture array, which third echo beam is generated by the second acoustic beam; (g) estimating a third mean Doppler frequency from the third echo beam; (h) estimating a second blood flow angle in the region of interest in the blood vessel from the first and third mean Doppler frequencies; and (i) comparing the first and second blood flow angles and providing a warning if the values differ by more than a predetermined amount.

An embodiment of a third aspect of the present invention is a method for providing a blood flow velocity distribution display of blood in a blood vessel using an ultrasound imaging system, which method comprises the steps of: (a) transmitting an acoustic beam to a region of interest in the blood vessel from a transducer array; (b) receiving a first echo beam from the region of interest at a first sub-aperture array, which first echo beam is generated by the acoustic beam, and a second echo from the region of interest at a second sub-aperture array, which second echo beam is generated by the acoustic beam; (c) estimating a first mean Doppler frequency from the first echo beam substantially in parallel with the step of estimating a second mean Doppler frequency from the second echo beam; (d) estimating a blood flow and blood flow velocity in the region of interest in the blood vessel from the first and second mean Doppler frequencies; (e) obtaining data to provide a spectral Doppler mode display; (f) converting the data to provide a blood flow velocity distribution; and; (g) displaying the blood flow velocity distribution along with the estimate of blood flow angle.

DETAILED DESCRIPTION

Figure 1:
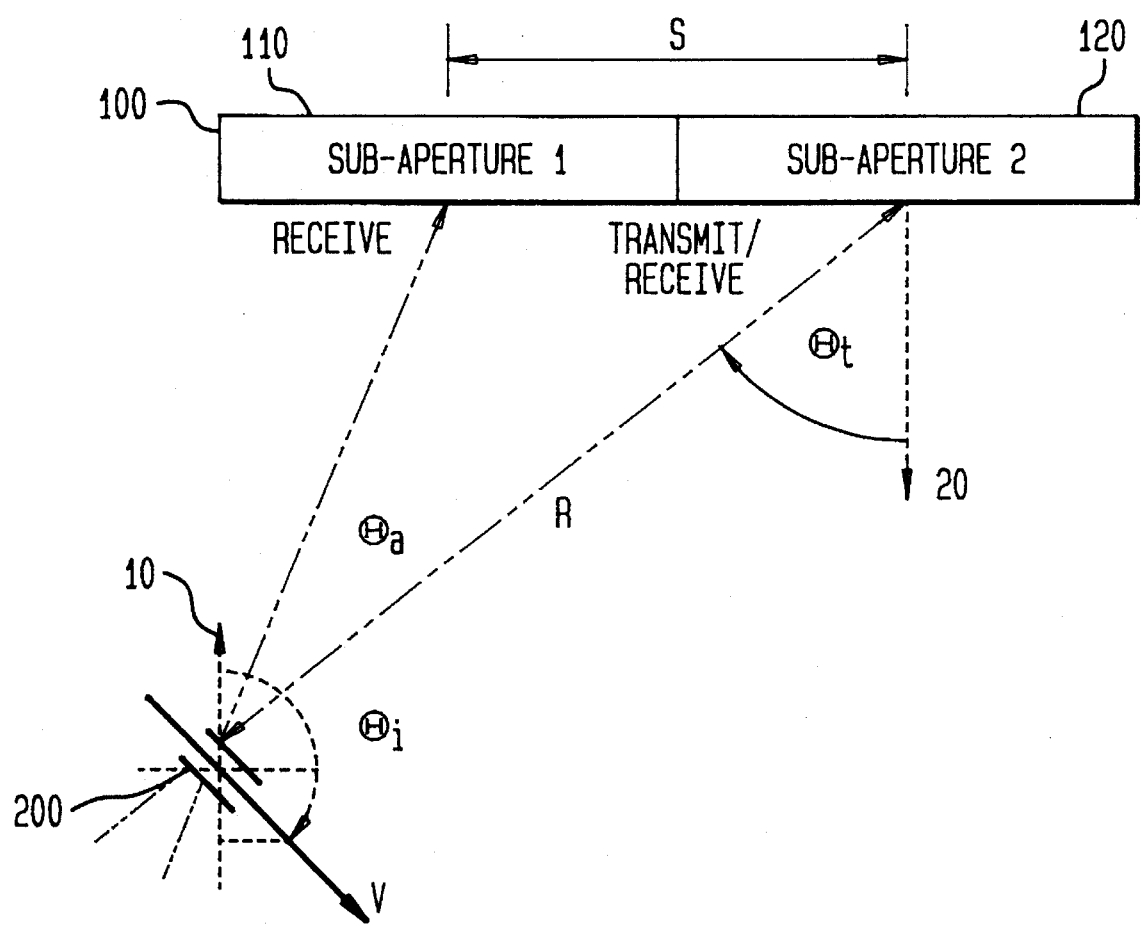
FIG. 1 shows, in pictorial form, a transducer array arrangement for transmit and receive beam geometries used to fabricate embodiments of the present invention.

FIG. 1 shows, in pictorial form, a transducer array arrangement for transmit and receive beam geometries used to fabricate embodiments of a first aspect of the present invention in an ultrasound imaging system. As shown in FIG. 1, blood vessel 200 has blood flowing therethrough with velocity V at an angle $\Theta_i$ with respect to arrow 10. In accordance with the first aspect of the present invention, transducer array 100 is broken down into sub-apertures 110 and 120. A single transmit beam is generated from sub-aperture 120 and receive beams are detected by sub-apertures 110 and 120. Sub-aperture 110 receives echoes caused by angular scattering and sub-aperture 120 receives echoes caused by backscattering.

As further shown in FIG. 1, the centers of sub-apertures 110 and 120 are separated by a predetermined distance S and R defines the distance between the center of sub-aperture 120 and a sample volume in the blood vessel of interest. In the preferred embodiment of the first aspect, transducer array 100 is a linear phased array and it is divided into two, equal sub-aperture arrays in a manner which is well known to those of ordinary skill in the art. For example, for a 64-element transducer array, each sub-aperture array will contain 32 elements. Further, each sub-aperture array is independently steered and focused. Methods for dividing full-aperture transducer array 100 into two, equal sub-aperture arrays 110 and 120 that can be steered, focused and that can receive simultaneously are well known in the art.

Figure 2:
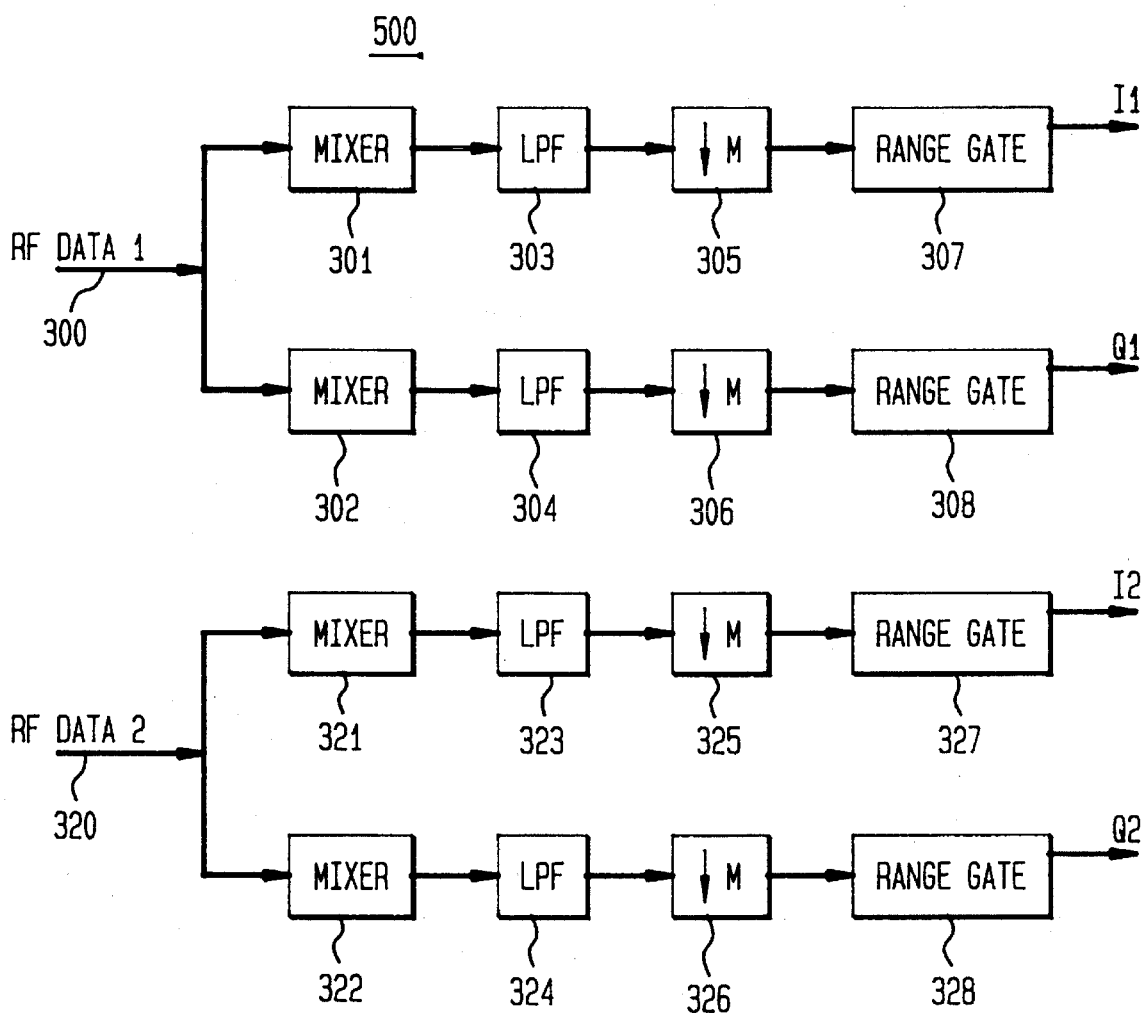
FIG. 2 is a block diagram of a data receiver portion of parallel processing channels which are configured in accordance with the present invention.

Each of sub-aperture arrays 110 and 120 generates beam-formed RF data on a separate channel and each of the two RF channels are then applied as input to digital receiver 500 shown in FIG. 2 for further processing.

In accordance with the preferred embodiment of the first aspect of the present invention, the two received beams are processed substantially simultaneously, in parallel, using two, identical processing channels in the system. FIG. 2 is a block diagram of data receiver 500 which receives RF data from receive beam 1 (sub-aperture 110) over leads 300 and RF data from receive beam 2 (sub-aperture 120) over leads 310. RF data 1 is applied as input to mixers 301 and 302 to transfer the RF data to baseband to generate in-phase and quadrature components of the data (generally referred to as I and Q components) in a manner which is well known to those of ordinary skill in the art. Next, the outputs from mixers 301 and 302 are applied to low pass filters 303 and 304, respectively, to remove image frequency. Next, the outputs from low pass filters 303 and 304 are applied as input to decimators 305 and 306 to decimate the sample rate by an integer. Note that in some instances, for example, in the case of a thin blood vessel having a small sample volume, one may not need to decimate the data because the number of samples will be small. Next, the outputs from decimators 305 and 306 are applied as input to range gates 307 and 308, respectively, to select the region of interest in a manner which is well known to those of ordinary skill in the art. As is well known to those of ordinary skill in the art, the outputs from range gates 307 and 308 are range-gated I1 and Q1, respectively, the in-phase and quadrature components of the data. Finally, range-gated I1 and Q1 are applied as input to accumulators 401 and 402 of trace processor 600 shown in FIG. 3. As further shown in FIG. 2, RF data 2 is processed in the same manner as RF data 1 was processed.

Figure 3:
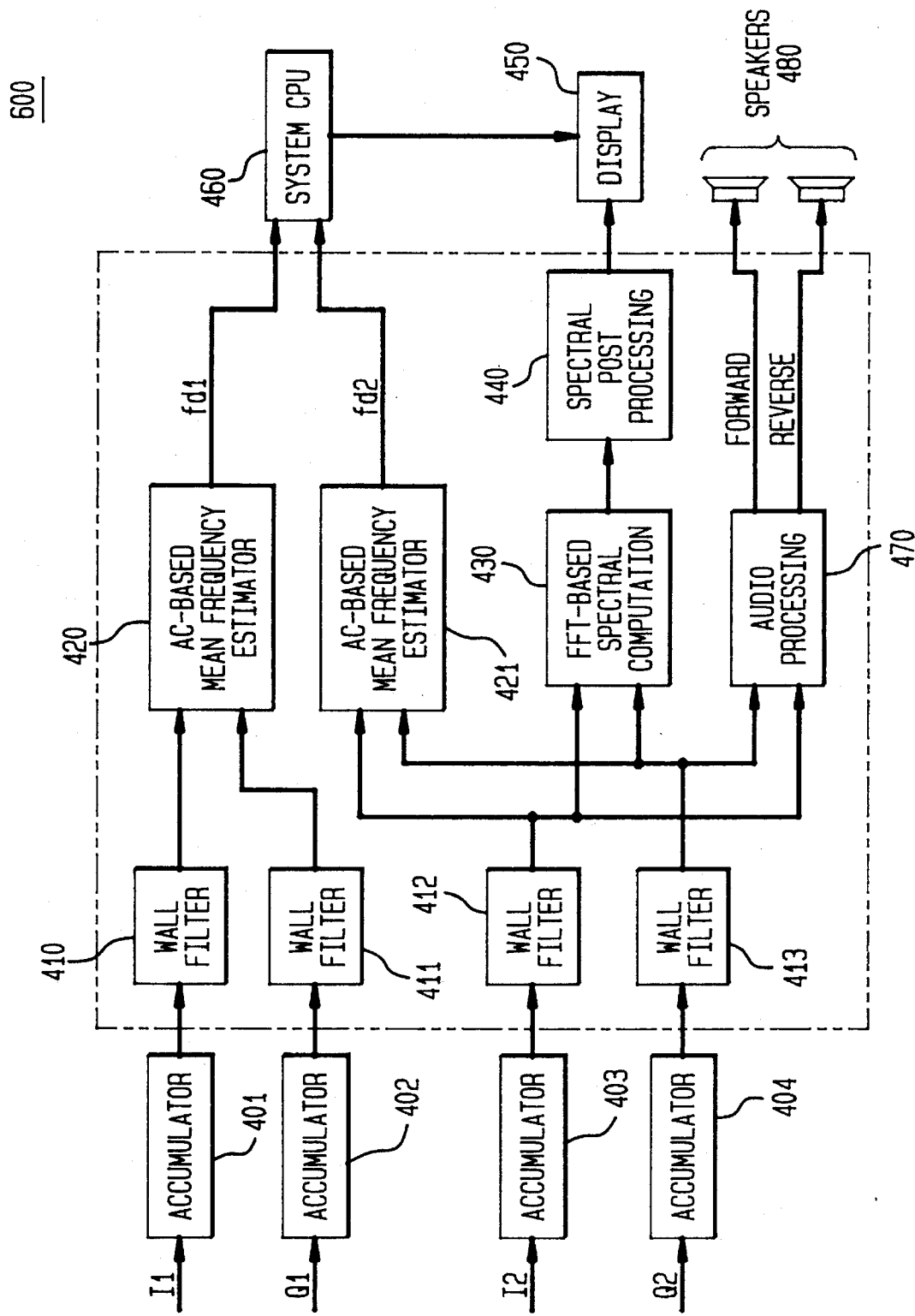
FIG. 3 is a block diagram of spectral and audio Doppler, parallel processing channels which are configured in accordance with the present invention.

As shown in FIG. 3, the I1, Q1, I2, and Q2 are accumulated in accumulators 401–404, respectively. Accumulators 401–404 reduce the data rate down to the pulse repetition rate. As is well known in the art, the pulse repetition rate (prf) represents the rate at which the transducer array can be energized for transmit (1/prf represents the time for a pulse to travel from the transducer to a region of interest and for a reflection therefrom to travel back to the transducer) and, as a consequence of the Nyquist theorem, determines the highest velocity that can be measured without aliasing.

The outputs from accumulators 401–404 are then applied as input to digital signal processor 600 (DSP 600) for analysis. In FIG. 3, the blocks within DSP 600 represent functions which are carried out by software running on DSP 600. As shown in FIG. 3, the accumulated values of range-gated I1, Q1, I2, and Q2 are applied as input to wall filters 410–413, respectively, where the data is wall filtered in a manner which is well known to those of ordinary skill in the art to remove reflection from vessel walls. As further shown in FIG. 3, the wall-filtered I and Q signals for each channel are passed to auto-correlation-based, AC-based mean frequency estimators 420 and 421, respectively, to determine the mean Doppler frequency of each of the receive beams. The algorithm utilized in auto-correlation-based estimators 420 and 421 will be described in detail below.

The mean Doppler frequency estimates output by AC-based mean frequency estimators 420 and 421 are applied as input to system CPU 460, where, in combination with predetermined scan geometry parameters, the estimated blood flow angle in blood vessel 200 is determined. The estimated blood flow angle is used to determine an estimate of the magnitude of the blood flow velocity in blood vessel 200. Although the determination of estimated blood flow angle is preferred to be carded out in system CPU 460 due the need to utilize sine, cosine and inverse sine functions, the present invention is not limited thereby. In fact the calculations could be carried out on any suitable processor.

System CPU 460 "knows" the geometry of the scan, i.e., the R and S parameter values, the angle between the two receive beams, and the transmit beam angle since system CPU 460 generated these data.

As shown in FIG. 3, data from sub-aperture 120 is applied to FFT-based spectral computation apparatus 430 and to audio processing apparatus 470. As is well known to those of ordinary skill in the art, FFT-based spectral computation apparatus 430 analyzes the sampled data to obtain data which is applied as input to spectral post processing apparatus 440. Spectral post processing apparatus 440 is apparatus which is well known to those of ordinary skill in the art for producing data used to provide a spectral Doppler mode display. For example, spectral post processing apparatus 440 removes noise, smoothes the image, performs black-dot filling, and so forth. The output from spectral post processing apparatus 440 is applied to display apparatus, along with the estimated blood flow angle and estimated blood flow velocity from system CPU 460. In response, display apparatus 450 produces a blood flow velocity distribution. In addition, audio processing apparatus 470 produces an audio output which is applied to stereo speakers 480. As is well known to those of ordinary skill in the art, audio processing apparatus 470 separates forward and reverse flows from I2 and Q2 and applies a forward flow signal at the prf rate to the right channel and applies a reverse flow signal at the prf rate to the left channel.

The following describes the method utilized to determine the flow angle and the velocity magnitude using the Doppler mean frequency estimates $f_{d1}$ and $_{d2}$. $f_{d1}$ and $f_{d2}$ are given as follows:

$$f_{d2} = 2|V| \cos(\Theta_i + \Theta_t) f_o / c \tag{1}$$

$$f_{d1} = |V| [\cos(\Theta_i + \Theta_t) + \cos(\Theta_i + \Theta_t + \Theta_a)] f_o / c \tag{2}$$

where $f_o$ is the transmit frequency, c is the speed of sound, $|V|$ is the magnitude of the flow velocity, blood flow is at angle $\Theta_i$ with respect to arrow 10 shown in FIG. 1, the transmit and receive beam of sub-aperture 120 occur at angle $\Theta_t$ with respect to arrow 20 shown in FIG. 1, and $\Theta_a$ is the angle between the two receive beams shown in FIG. 1. $\Theta_a$ can be expressed as follows:

$$\Theta_a = \sin^{-1}[S \cos(\Theta_t)/(R^2 + S^2 + 2RS \sin(\Theta_t))^{1/2}] \tag{3}$$

where S is the distances between the centers of sub-aperture arrays 110 and 120 shown in FIG. 1 and R is range distance from the center of sub-aperture 120 and the sample volume in blood vessel 200. Eqn. (1) and (2) are solved to provide the blood flow angle $\Theta_i$ and velocity magnitude $|V|$ which are expressed as follows:

$$\Theta_i = \tan^{-1}[(1 + \cos(\Theta_a) - 2f_{d1}/f_{d2}) / \sin(\Theta_a)] - \Theta_t \tag{4}$$

$$|V| = (f_{d2} c)/(2f_o \cos(\Theta_i + \Theta_t)) \tag{5}$$

In eqn. (4), the signs of $f_{d1}$ and $f_{d2}$ are lost during the division of $f_{d1}/f_{d2}$. Therefore, eqn. (4) is valid only for $f_{d2} > 0$, i.e., for 180 degrees of the possible 360 degrees of flow. The corrected angle, i.e., the estimate of the direction of flow which is valid for all 360 degrees is given by:

$$\Theta_{icorr} = \begin{cases} \Theta_i & \text{for } f_{d2} > 0 \\ \Theta_i - 180° & \text{for } f_{d2} < 0 \text{ and } \Theta_i > 0 \\ \Theta_i + 180° & \text{for } f_{d2} < 0 \text{ and } \Theta_i \leq 0 \end{cases} \tag{6}$$

However, there are four cases to consider. In case 1, if the direction of blood flow is not perpendicular or close to perpendicular to either of the two receive beams, then the direction of blood flow can be determined using eqn. (6). In case 2, if both $abs(f_{d1})$ and $abs(f_{d2})$ are zero or below a user defined frequency threshold, then it can be assumed that the true Doppler frequency shift is zero and no angle needs to be calculated.

In case 3, if the estimate $f_{d2}$ is effectively zero, i.e., smaller than a user defined frequency threshold, and $abs(f_{d1})$ is larger than the user defined frequency threshold, the direction of blood flow is given by:

$$\Theta_{icorr} = \begin{cases} -90° - \Theta_t & \text{for } f_{d1} > 0 \\ +90° - \Theta_t & \text{for } f_{d1} < 0 \end{cases} \tag{7}$$

In case 4, if the estimate $f_{d1}$ is effectively zero, i.e., smaller than a user defined frequency threshold, and $abs(f_{d2})$ is larger than the above-mentioned user defined frequency threshold, the direction of blood flow is given by:

$$\Theta_{icorr} = \begin{cases} -90° - \Theta_t + \Theta_a/2 & \text{for } f_{d2} > 0 \\ +90° - \Theta_t + \Theta_a/2 & \text{for } f_{d2} < 0 \end{cases} \tag{8}$$

The accuracy of the above calculation depends mostly on the quality of the mean Doppler frequency estimator. In the preferred embodiment an auto-correlation-based algorithm is utilized to obtain estimates of mean Doppler frequency, $f_{est}$, from the first lag of the complex auto-correlation. The real and imaginary parts, respectively, of the first lag auto-correlation are given as:

$$X = \sum_{n=2}^{M} [Q(n)I(n-1) - Q(n-1)I(n)] \tag{9}$$

$$Y = \sum_{n=2}^{M} [I(n)I(n-1) + Q(n)I(n-1)]$$

where the sums are from n=2 to n=M (M is the number of accumulated I(n) and Q(n) samples) and I(n) and Q(n) are the nth samples of the I and Q components for each channel. As discussed above, due to decimation and accumulation, the samples are at the pulse repetition rate. $f_{est}$ is obtained as follows:

$$f_{est} = (1/2\pi) \tan^{-1}(X/Y) \tag{10}$$

Figure 4:
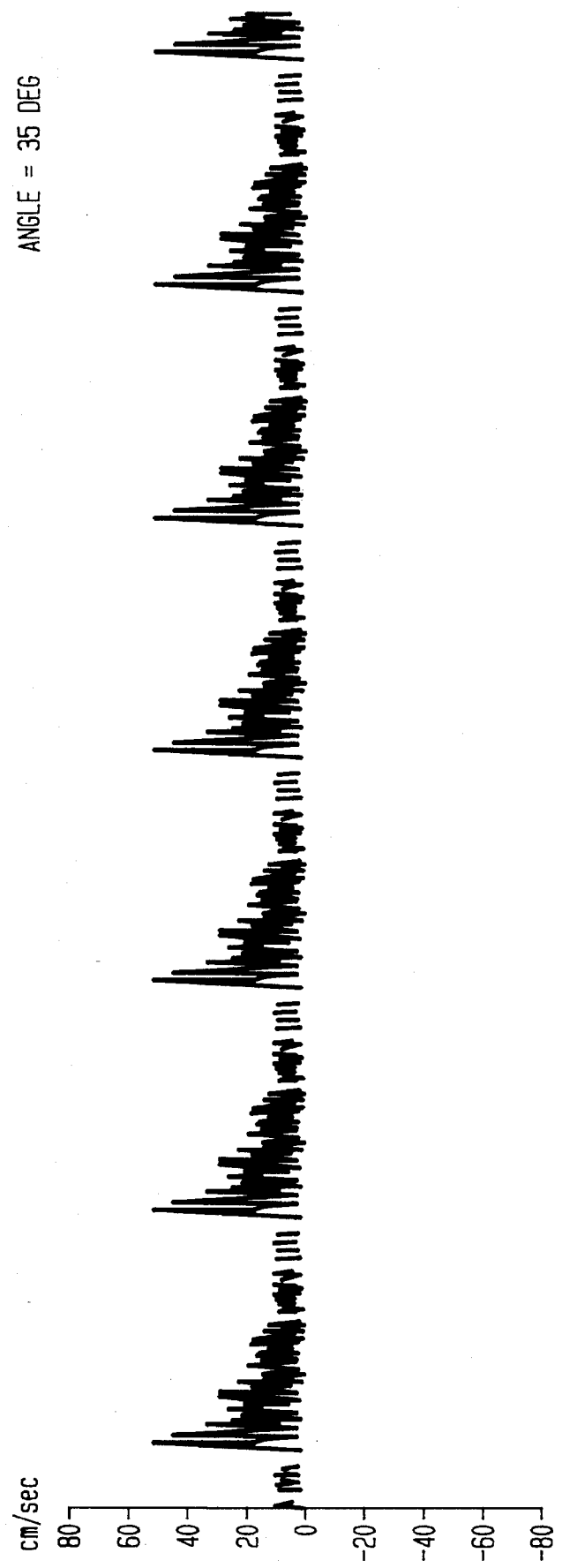
FIG. 4 shows, in pictorial form, a blood flow velocity distribution display which is provided in accordance with the present invention

FIG. 4 shows, in pictorial form, a blood flow velocity distribution display which is provided in accordance with the present invention. As shown in FIG. 4, the blood flow angle is displayed and the graph is scaled with respect to velocity. Further, in accordance with the present invention, the user will receive a warning whenever the geometry of the blood flow and the transducer array is such that the velocity measurements would be inaccurate. For example, inaccurate measurements might occur if $(\Theta_i + \Theta_t)$, i.e., the Doppler angle (the angle between the transmit beam and the direction of blood flow), exceeds a predetermined threshold. Thus, in accordance with a preferred embodiment of the present invention, such a warning is given whenever, for example, $\Theta_i + \Theta_t$ exceeds 70°, or whenever $\Theta_a$, the angle between the two receive beams, falls below a predetermined threshold which may be user defined.

As one can see from FIG. 3, the blood flow velocity distribution display is generated using sub-aperture 120, Although this may result in a loss of resolution, this loss of resolution is acceptable for this display. However, in further embodiments of the present invention, the data which is utilized for input to FFT-based spectral computation 430 is received from echoes received from transmit beams using the full-aperture transducer array 1000. In this embodiment, the estimated blood flow angle and estimated blood velocity are obtained at intervals and the values obtained utilizing sub-apertures 110 and 120 are utilized to generate the blood flow velocity distribution display data obtained utilizing the full-aperture array during these intervals. The time between intervals can be adjusted by the user to provide smaller or larger intervals, depending on whether there is higher or lower blood flow velocity.

In a second aspect of the present invention, an estimate of blood flow angle and blood flow velocity is made using two techniques. In the first technique, an estimate is made in the manner that was described above. In the second technique, an estimate is made by generating a transmit beam from sub-aperture 110 (instead of from sub-aperture 120) and detecting receive beams by sub-apertures 110 and 120. In the second technique, the Doppler mean frequency estimates $f'_{d1}$ and $f'_{d2}$ are given by:

$$f'_{d1} = 2|V| \cos(\Theta_i + \Theta_t + \Theta_a) f_o/c \quad (11)$$

$$f'_{d2} = |V|[\cos(\Theta_i + \Theta_t) + \cos(\Theta_i + \Theta_t + \Theta_a)] f_o/c \quad (12)$$

As one can see from eqn. (2) and (12), $f'_{d2} = f_{d1}$. However, in this second aspect of the present invention, $\Theta_a$ is given by eqn. (3) and $\Theta_i$ is given by:

$$\Theta_i = \tan^{-1}[(f'_{d1}/f_{d2} - \sin(\Theta_a))/\cos(\Theta_a)] - \Theta_t \quad (13)$$

and $|V|$ is given by:

$$|V| = (f'_{d1} c)/(2f_o \cos(\Theta_i + \Theta_t + \Theta_a)) \quad (14)$$

Note that eqn. (13) and (14) utilize $f'_{d1}$ obtained from the second technique and $f_{d2}$ obtained from the first technique. It is believed that values obtained using eqn.(13) and (14) ought to be more accurate than values obtained using the first technique and eqn. (4) and (5) whenever $\Theta_a$, the angle between the two receive beams, is small. In accordance with this second aspect of the present invention, the estimate of blood flow angle and blood flow velocity produced in accordance with the two techniques, i.e., eqn. (4) and (5) for the first technique and eqn. (13) and (14) for the second technique, are compared in system CPU 460. If the estimates differ by a predetermined amount, a warning is provided to the user that the estimate of blood velocity may be inaccurate. This inaccuracy may be due, for example, to a reversal in blood flow direction.

As was discussed above with respect to the first aspect of the present invention, a corrected angle $\Theta_{icorr}$, i.e., the estimate of the direction of flow which is valid for all 360 degrees is given by:

$$\Theta_{icorr} = \begin{cases} \Theta_i & \text{for } f_{d2} > 0 \\ \Theta_i - 180° & \text{for } f_{d2} < 0 \text{ and } \Theta_i > 0 \\ \Theta_i + 180° & \text{for } f_{d2} < 0 \text{ and } \Theta_i \leq 0 \end{cases} \quad (15)$$

However, again, there are four cases to consider. In case 1, if the direction of blood flow is not perpendicular or close to perpendicular to either of the two receive beams, then the direction of blood flow can be determined using eqn. (6). In case 2, if both abs($f'_{d1}$) and abs($f_{d2}$) are zero or below a user defined frequency threshold, then it can be assumed that the true Doppler frequency shift is zero and no angle needs to be calculated.

In case 3, if the estimate $f_{d2}$ is effectively zero, i.e., smaller than a user defined frequency threshold, and abs($f'_{d1}$) is larger than a user defined frequency threshold, the direction of blood flow is given by:

$$\Theta_{icorr} = \begin{cases} -90° - \Theta_t & \text{for } f_{d1}' > 0 \\ +90° - \Theta_t & \text{for } f_{d1}' < 0 \end{cases} \quad (16)$$

In case 4, if the estimate $f'_{d1}$ is effectively zero, i.e., smaller than a user defined frequency threshold, and abs($f_{d2}$) is larger than the above-mentioned user defined frequency threshold, the direction of blood flow is given by:

$$\Theta_{icorr} = \begin{cases} -90° - \Theta_t + \Theta_a & \text{for } f_{d2} > 0 \\ +90° - \Theta_t + \Theta_a & \text{for } f_{d2} < 0 \end{cases} \quad (17)$$

Note that, in accordance with the first aspect of the present invention, a Doppler mode may be interleaved with a B-mode, this is generally referred to in the an as a duplex mode. In the duplex mode, a first interval would be used for Doppler and a second interval would be used for B-mode, and so forth. In accordance with the second aspect of the present invention, one would utilize interleaving wherein a first interval would be used for Doppler according to the first technique, a second interval would be utilized for Doppler according to the second technique, and a third interval would be utilized for B-mode. In accordance with a preferred embodiment of the present invention, the second interval would be shorter than the first interval. As one can readily appreciate, embodiments of the present invention are not limited to the described interleaving and may utilize other types of interleaving where, for example, the second technique may not only be performed on shorter intervals but not always following a Doppler interval using the first technique. It should be further noted that during intervals of Doppler which utilize the second technique, data for spectral Doppler processing, as carried out by the embodiment shown in FIG. 3, will not be available. This is because the transmit beam switched from sub-aperture 120 to sub-aperture 110. However, this may be taken care of by utilizing the receive beam at sub-aperture 110 to provide data for the spectral Doppler analysis.

Figure 5:
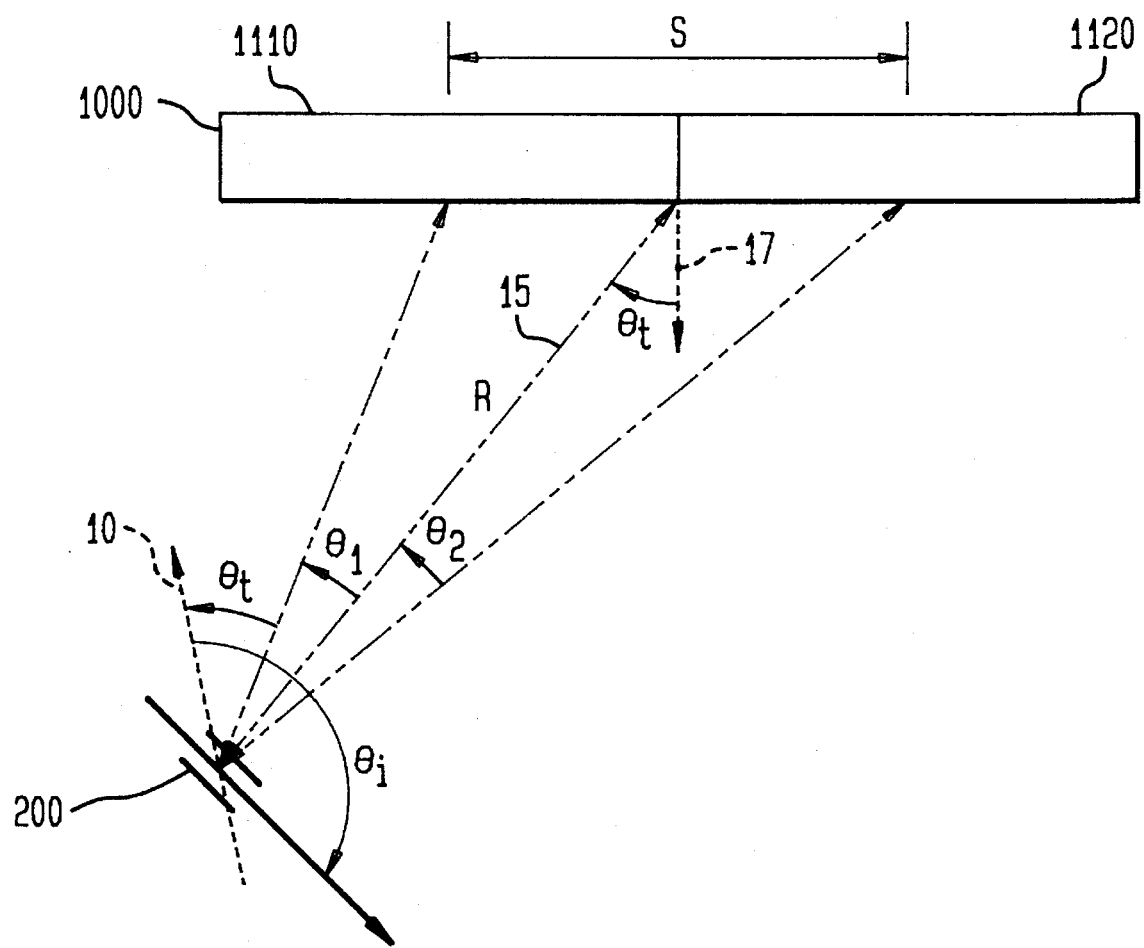
FIG. 5 shows, in pictorial form, a transducer array arrangement for transmit and receive beam geometries used to fabricate alternative embodiments of the present invention.

FIG. 5 shows, in pictorial form, a transducer array arrangement for transmit and receive beam geometries used to fabricate embodiments in accordance with a third aspect of the present invention. As shown in FIG. 5, blood vessel 200 has blood flowing therethrough with velocity V at an angle $\Theta_i$ with respect to arrow 10. In accordance with this aspect of the present invention, transducer 1000 is broken down into sub-apertures 1110 and 1120. A transmit beam is generated utilizing all of transducer array 1000 and receive beams are detected by sub-apertures 110 and 120. As further shown in FIG. 5, the centers of sub-apertures 1110 and 1120 are separated by a predetermined distance S and R defines the distance between the center of transducer array 1000 and a sample volume in the blood vessel of interest. The processing of the receive beam data is similar to that shown in FIGS. 2 and 3 except that the equations are solved as follows.

$$f_{d2} = |V|[\cos(\Theta_i + \Theta_t) + \cos(\Theta_i + \Theta_t + \Theta_2)] f_o/c \quad (18)$$

$$f_{d1} = |V|[\cos(\Theta_i + \Theta_t) + \cos(\Theta_i + \Theta_t + \Theta_1)] f_o/c \quad (19)$$

where $f_o$ is the transmit frequency, c is the speed of sound, |V| is the magnitude of the flow velocity, blood flow is at angle $\Theta_i$ with respect to arrow 10 shown in FIG. 5, the receive beam of sub-aperture 120 occurs at angle $\Theta_2$ with respect to arrow 15 shown in FIG. 5, the receive beam of sub-aperture 110 occurs at angle $\Theta_1$ with respect to arrow 15 shown in FIG. 5, and the transmit beam of transducer array 1000 occurs at angle $\Theta_t$ with respect to arrow 17 shown in FIG. 5. Blood flow angle $\Theta_1$ and velocity magnitude |V| can be expressed as follows:

$$zn = f_{d1}(1 + \cos(\Theta_2)) - f_{d2}(1 + \cos(\Theta_1))$$

$$zd = f_{d1} \sin(\Theta_2) - f_{d2} \sin(\Theta_1)$$

$$\Theta_i = \tan^{-1}[zn/zd] - \Theta_t \quad (20)$$

$$|V| = (f_{d2}c)/[\cos(\Theta_i + \Theta_t) + \cos(\Theta_i + \Theta_t + \Theta_2)] \quad (21)$$

As was discussed above with respect to the first and second aspects of the present invention, a corrected angle $\Theta_{icorr}$, i.e., the estimate of the direction of flow which is valid for all 360 degrees is given by:

$$\Theta_{icorr} = \begin{cases} \Theta_i & \text{for } f_{d2} > 0 \\ \Theta_i - 180° & \text{for } f_{d2} < 0 \text{ and } \Theta_i > 0 \\ \Theta_i + 180° & \text{for } f_{d2} < 0 \text{ and } \Theta_i \leq 0 \end{cases} \quad (22)$$

However, again, there are four cases to consider. In case 1, if the direction of blood flow is not perpendicular or close to perpendicular to either of the two receive beams, then the direction of blood flow can be determined using eqn. (6). In case 2, if both abs($f_{d1}$) and abs($f_{d2}$) are zero or below a user defined frequency threshold, then it can be assumed that the true Doppler frequency shift is zero and no angle needs to be calculated.

In case 3, if the estimate $f_{d2}$ is effectively zero, i.e., smaller than a user defined frequency threshold, and abs($f_{d1}$) is larger than a user defined frequency threshold, the direction of blood flow is given by:

$$\Theta_{icorr} = \begin{cases} -90° - \Theta_t - \Theta_2/2 & \text{for } f_{d1} > 0 \\ +90° - \Theta_t + \Theta_2/2 & \text{for } f_{d1} < 0 \end{cases} \quad (23)$$

In case 4, if the estimate $f_{d1}$ is effectively zero, i.e., smaller than a user defined frequency threshold, and abs($f_{d2}$) is larger than the above-mentioned user defined frequency threshold, the direction of blood flow is given by:

$$\Theta_{icorr} = \begin{cases} -90° - \Theta_t + \Theta_2 + \Theta_1/2 & \text{for } f_{d2} > 0 \\ +90° - \Theta_t + \Theta_2 + \Theta_1/2 & \text{for } f_{d2} < 0 \end{cases} \quad (24)$$

The rest of the processing to provide the blood flow velocity distribution and display of blood flow angle proceed in similar fashion as has been described above with respect to the embodiment shown in FIGS. 1–4.

Although various modifications may be suggested by those versed in the art, it should be understood that we wish to embody within the scope of the patent granted hereon all such modification as reasonably and properly come within the scope of our contribution to the art. For example, in alternative embodiments of the present invention, during intervals when a full-aperture transducer is divided into two sub-apertures for providing angle estimation, data for spectral and audio Doppler processing will be acquired from the receive-only sub-aperture, i.e., the sub-aperture that is not transmitting the beam. This alternative embodiment is advantageous in that data acquired for the spectral Doppler processing will be similar to the Continuous-Wave (CW) Doppler mode where the transmit and receive transducers are different. As one can readily appreciate, this alternative embodiment is fabricated by switching the input to FFT-Based Spectral Computation 430 and audio processing 470 of FIG. 3 from wall filters 412 and 413 to wall filters 410 and 411. Of course, the use of a switch, in a manner which can readily be understood by those of ordinary skill in the art, can facilitate switching between embodiments where the data acquired for the spectral and audio Doppler processing is acquired from the transmit-and-receive sub-aperture or from the receive-only sub-aperture.

What is claimed is:

1. Method for providing a blood flow velocity distribution display of blood in a blood vessel using an ultrasound imaging apparatus, which method comprises the steps of:

transmitting an acoustic beam to a region of interest in the blood vessel from a first sub-aperture array in a transducer array;

receiving a first echo beam from the region of interest at the first sub-aperture array, which first echo beam is generated by the acoustic beam, and a second echo from the region of interest at a second sub-aperture array, which second echo beam is generated by the acoustic beam;

estimating a first mean Doppler frequency from the first echo beam substantially in parallel with the step of estimating a second mean Doppler frequency from the second echo beam;

estimating a blood flow angle and blood flow velocity in the region of interest in the blood vessel from the first and second mean Doppler frequencies;

obtaining data to provide a spectral Doppler mode display;

converting the data to provide a blood flow velocity distribution; and;

displaying the blood flow velocity distribution along with the estimate of blood flow angle.

2. The method of claim 1 wherein both steps of estimating utilize an auto-correlation algorithm.

3. The method of claim 1 wherein the step of obtaining data to provide a spectral Doppler display comprises the step of utilizing data obtained from the first echo beam.

4. The method of claim 1 wherein the step of obtaining data to provide a spectral Doppler display comprises the step of transmitting an acoustic beam to the region of interest in the blood vessel from the entire transducer array.

5. The method of claim 1 which further comprises the step of generating a warning when an estimate of blood flow angle, relative to the transmitted acoustic beam, exceeds a predetermined value.

6. The method of claim 1 which further comprising the step of obtaining data to provide an aural output of forward and reverse blood flow.

7. The method of claim 6 wherein the step of obtaining data to provide an aural output comprises the step of utilizing data obtained from the fist echo beam.

8. The method of claim 6 wherein the step of obtaining data to provide an aural output comprises the step of transmitting an acoustic beam to the region of interest in the blood vessel from the entire transducer array.

9. The method of claim 1 wherein each of the steps of estimating further comprises the step of reducing the data rate to the pulse repetition rate of the transducer array.

10. The method of claim 9 wherein the step of reducing comprises the steps of decimating and accumulating.

11. Method for providing a blood flow velocity distribution display of blood in a blood vessel using an ultrasound imaging apparatus, which method comprises the steps of:

transmitting an acoustic beam to a region of interest in the blood vessel from a first sub-aperture array in a transducer array;

receiving a first echo beam from the region of interest at the first sub-aperture array, which first echo beam is generated by the acoustic beam, and a second echo from the region of interest at a second sub-aperture array, which second echo beam is generated by the acoustic beam;

estimating a first mean Doppler frequency from the first echo beam substantially in parallel with the step of estimating a second mean Doppler frequency from the second echo beam;

estimating a first blood flow angle in the region of interest in the blood vessel from the first and second mean Doppler frequencies;

transmitting a second acoustic beam to a region of interest in the blood vessel from the second sub-aperture array;

receiving a third echo beam from the region of interest at the second sub-aperture array, which third echo beam is generated by the second acoustic beam;

estimating a third mean Doppler frequency from the third echo beam;

estimating a second blood flow angle in the region of interest in the blood vessel from the first and third mean Doppler frequencies; and comparing the first and second blood flow angles and providing a warning if the values differ by more than a predetermined amount.

12. Method for providing a blood flow velocity distribution display of blood in a blood vessel using an ultrasound imaging apparatus, which method comprises the steps of:

transmitting an acoustic beam to a region of interest in the blood vessel from a transducer array;

receiving a first echo beam from the region of interest at a first sub-aperture array, which first echo beam is generated by the acoustic beam, and a second echo from the region of interest at a second sub-aperture array, which second echo beam is generated by the acoustic beam;

estimating a first mean Doppler frequency from the first echo beam substantially in parallel with the step of estimating a second mean Doppler frequency from the second echo beam;

estimating a blood flow and blood flow velocity in the region of interest in the blood vessel from the first and second mean Doppler frequencies;

obtaining data to provide a spectral Doppler mode display;

converting the data to provide a blood flow velocity distribution; and;

displaying the blood flow velocity distribution along with the estimate of blood flow angle.

13. The method of claim 1 wherein the first and second sub-aperture arrays are of equal size.

14. The method of claim 11 wherein the first and second sub-aperture arrays are of equal size.

15. The method of claim 12 wherein the first and second sub-aperture arrays are of equal size.

* * * * *